(12) United States Patent
Kromer et al.

(10) Patent No.: US 9,453,644 B2
(45) Date of Patent: Sep. 27, 2016

(54) OXYGEN TRANSPORT MEMBRANE BASED ADVANCED POWER CYCLE WITH LOW PRESSURE SYNTHESIS GAS SLIP STREAM

(71) Applicants: Brian R. Kromer, Buffalo, NY (US); Michael M. Litwin, Cheektowaga, NY (US); Sean M. Kelly, Pittsford, NY (US)

(72) Inventors: Brian R. Kromer, Buffalo, NY (US); Michael M. Litwin, Cheektowaga, NY (US); Sean M. Kelly, Pittsford, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 490 days.

(21) Appl. No.: 14/138,619

(22) Filed: Dec. 23, 2013

(65) Prior Publication Data
US 2014/0183866 A1 Jul. 3, 2014

Related U.S. Application Data

(60) Provisional application No. 61/746,820, filed on Dec. 28, 2012.

(51) Int. Cl.
| | | |
|---|---|---|
| F23L 7/00 | (2006.01) | |
| F01K 13/00 | (2006.01) | |
| F01K 23/16 | (2006.01) | |
| F01K 7/16 | (2006.01) | |
| F23L 15/04 | (2006.01) | |
| F01K 23/06 | (2006.01) | |

(52) U.S. Cl.
CPC ............... *F23L 7/007* (2013.01); *F01K 7/16* (2013.01); *F01K 13/006* (2013.01); *F01K 23/067* (2013.01); *F01K 23/16* (2013.01); *F23L 15/04* (2013.01); *F23C 2900/99011* (2013.01);
(Continued)

(58) Field of Classification Search
IPC .............. F23C 2900/99011; F23L 7/007,15/04, F23L 7/00, 15/00; F01K 13/006, 23/16, F01K 7/16, 23/067, 23/12; Y02E 20/18, Y02E 20/344, 20/348, 20/34, 20/30
See application file for complete search history.

(56) References Cited

U.S. PATENT DOCUMENTS

| | | |
|---|---|---|
| 2,593,507 A | 4/1952 | Wainer |
| 2,692,760 A | 10/1954 | Flurschutz |

(Continued)

FOREIGN PATENT DOCUMENTS

| | | |
|---|---|---|
| DE | 10330859 A1 | 2/2004 |
| DE | 102004038435 A1 | 2/2006 |

(Continued)

OTHER PUBLICATIONS

Lee Rosen, Nick Degenstein; Minish Shah; Jamie Wilson; Sean Kelly; John Peck; and Max Christie; "Development of Oxygen Transport Membranes for Coal-Based Power Generation"; ScienceDirect (Available online at www.sciencedirect.com); Energy Procedia 4 (2011) pp. 750-755.

(Continued)

*Primary Examiner* — David Walczak
(74) *Attorney, Agent, or Firm* — Ralph J. Mancini

(57) ABSTRACT

A method and system for generating electrical power in which a high pressure synthesis gas stream generated in a gasifier is partially oxidized in an oxygen transport membrane based reactor, expanded and thereafter, is combusted in an oxygen transport membrane based boiler. A low pressure synthesis gas slip stream is split off downstream of the expanders and used as the source of fuel in the oxygen transport membrane based partial oxidation reactors to allow the oxygen transport membrane to operate at low fuel pressures with high fuel utilization. The combustion within the boiler generates heat to raise steam to in turn generate electricity by a generator coupled to a steam turbine. The resultant flue gas can be purified to produce a carbon dioxide product.

15 Claims, 2 Drawing Sheets

(52) U.S. Cl.
CPC .............. *Y02E20/18* (2013.01); *Y02E 20/344* (2013.01); *Y02E 20/348* (2013.01)

(56) References Cited

U.S. PATENT DOCUMENTS

| | | | |
|---|---|---|---|
| 3,282,803 A | 11/1966 | Poepel et al. | |
| 3,317,298 A | 5/1967 | Klomp et al. | |
| 3,770,621 A | 11/1973 | Collins et al. | |
| 3,861,723 A | 1/1975 | Kunz et al. | |
| 3,868,817 A * | 3/1975 | Marion | C01B 3/36 252/373 |
| 3,930,814 A | 1/1976 | Gessner | |
| 3,976,451 A | 8/1976 | Blackmer et al. | |
| 4,013,592 A | 3/1977 | Matsuoka et al. | |
| 4,128,776 A | 12/1978 | Bonaquist et al. | |
| 4,153,426 A | 5/1979 | Wintrell | |
| 4,162,993 A | 7/1979 | Retalick | |
| 4,175,153 A | 11/1979 | Dobo et al. | |
| 4,183,539 A | 1/1980 | French et al. | |
| 4,206,803 A | 6/1980 | Finnemore et al. | |
| 4,261,167 A | 4/1981 | Paull et al. | |
| 4,292,209 A | 9/1981 | Marchant et al. | |
| 4,350,617 A | 9/1982 | Retalick et al. | |
| 4,357,025 A | 11/1982 | Eckart | |
| 4,365,021 A | 12/1982 | Pirooz | |
| 4,373,575 A | 2/1983 | Hayes | |
| 4,402,871 A | 9/1983 | Retalick | |
| 4,609,383 A | 9/1986 | Bonaventura et al. | |
| 4,631,238 A | 12/1986 | Ruka | |
| 4,650,814 A | 3/1987 | Keller | |
| 4,651,809 A | 3/1987 | Gollnick et al. | |
| 4,720,969 A | 1/1988 | Jackman | |
| 4,734,273 A | 3/1988 | Haskell | |
| 4,749,632 A | 6/1988 | Flandermeyer et al. | |
| 4,783,085 A | 11/1988 | Wicks et al. | |
| 4,791,079 A | 12/1988 | Hazbun | |
| 4,862,949 A | 9/1989 | Bell, III | |
| 4,866,013 A | 9/1989 | Anseau et al. | |
| 5,021,137 A | 6/1991 | Joshi et al. | |
| 5,035,726 A | 7/1991 | Chen et al. | |
| 5,061,297 A | 10/1991 | Krasberg | |
| 5,143,751 A | 9/1992 | Richards et al. | |
| 5,169,506 A | 12/1992 | Michaels | |
| 5,169,811 A | 12/1992 | Cipollini et al. | |
| 5,171,646 A | 12/1992 | Rohr | |
| 5,185,301 A | 2/1993 | Li et al. | |
| 5,205,990 A | 4/1993 | Lawless | |
| 5,240,480 A | 8/1993 | Thorogood et al. | |
| 5,259,444 A | 11/1993 | Wilson | |
| 5,286,686 A | 2/1994 | Haig et al. | |
| 5,298,469 A | 3/1994 | Haig et al. | |
| 5,302,258 A | 4/1994 | Renlund et al. | |
| 5,306,411 A | 4/1994 | Mazanec et al. | |
| 5,342,705 A | 8/1994 | Minh et al. | |
| 5,432,705 A | 8/1994 | Minh et al. | |
| 5,356,730 A | 10/1994 | Minh et al. | |
| 5,417,101 A | 5/1995 | Weich | |
| 5,454,923 A | 10/1995 | Nachlas et al. | |
| 5,478,444 A | 12/1995 | Liu et al. | |
| 5,534,471 A | 7/1996 | Carolan et al. | |
| 5,547,494 A | 8/1996 | Prasad et al. | |
| 5,569,633 A | 10/1996 | Carolan et al. | |
| 5,599,509 A | 2/1997 | Toyao et al. | |
| 5,643,355 A | 7/1997 | Phillips et al. | |
| 5,649,517 A | 7/1997 | Poola et al. | |
| 5,707,911 A | 1/1998 | Rakhimov et al. | |
| 5,750,279 A | 5/1998 | Carolan et al. | |
| 5,804,155 A | 9/1998 | Farrauto et al. | |
| 5,820,654 A | 10/1998 | Gottzman et al. | |
| 5,820,655 A | 10/1998 | Gottzmann et al. | |
| 5,837,125 A | 11/1998 | Prasad et al. | |
| 5,855,762 A | 1/1999 | Phillips et al. | |
| 5,864,576 A | 1/1999 | Nakatani et al. | |
| 5,902,379 A | 5/1999 | Phillips et al. | |
| 5,927,103 A | 7/1999 | Howard | |
| 5,932,141 A | 8/1999 | Rostrop-Nielsen et al. | |
| 5,944,874 A | 8/1999 | Prasad et al. | |
| 5,964,922 A | 10/1999 | Keskar et al. | |
| 5,975,130 A | 11/1999 | Ligh et al. | |
| 5,980,840 A | 11/1999 | Kleefisch et al. | |
| 6,010,614 A | 1/2000 | Keskar et al. | |
| 6,035,662 A | 3/2000 | Howard et al. | |
| 6,048,472 A | 4/2000 | Nataraj et al. | |
| 6,051,125 A | 4/2000 | Pham et al. | |
| 6,070,471 A | 6/2000 | Westphal et al. | |
| 6,077,323 A | 6/2000 | Nataraj et al. | |
| 6,110,979 A | 8/2000 | Nataraj et al. | |
| 6,113,673 A | 9/2000 | Loutfy et al. | |
| 6,114,400 A | 9/2000 | Nataraj et al. | |
| 6,139,810 A | 10/2000 | Gottzmann et al. | |
| 6,153,163 A | 11/2000 | Prasad et al. | |
| RE37,134 E | 4/2001 | Wilson | |
| 6,214,066 B1 | 4/2001 | Nataraj et al. | |
| 6,214,314 B1 | 4/2001 | Nataraj et al. | |
| 6,290,757 B1 | 9/2001 | Lawless | |
| 6,293,084 B1 | 9/2001 | Drnevich et al. | |
| 6,296,686 B1 | 10/2001 | Prasad et al. | |
| 6,333,015 B1 * | 12/2001 | Lewis | C10J 1/207 423/418.2 |
| 6,352,624 B1 | 3/2002 | Crome et al. | |
| 6,360,524 B1 | 3/2002 | Drnevich et al. | |
| 6,368,491 B1 | 4/2002 | Cao et al. | |
| 6,382,958 B1 | 5/2002 | Bool, III et al. | |
| 6,394,043 B1 | 5/2002 | Bool, III et al. | |
| 6,402,988 B1 | 6/2002 | Gottzmann et al. | |
| 6,430,966 B1 | 8/2002 | Meinhardt et al. | |
| 6,468,328 B2 | 10/2002 | Sircar et al. | |
| 6,475,657 B1 | 11/2002 | Del-Gallo et al. | |
| 6,492,290 B1 | 12/2002 | Dyer et al. | |
| 6,532,769 B1 | 3/2003 | Meinhardt et al. | |
| 6,537,514 B1 | 3/2003 | Prasad et al. | |
| 6,562,104 B2 | 5/2003 | Bool, III et al. | |
| 6,592,731 B1 | 7/2003 | Lawless | |
| 6,638,575 B1 | 10/2003 | Chen et al. | |
| 6,641,626 B2 | 11/2003 | Van Calcar et al. | |
| 6,652,626 B1 | 11/2003 | Plee | |
| 6,681,589 B2 | 1/2004 | Brudnicki | |
| 6,695,983 B2 | 2/2004 | Prasad et al. | |
| 6,783,750 B2 | 8/2004 | Shah et al. | |
| 6,786,952 B1 | 9/2004 | Risdal et al. | |
| 6,811,904 B2 | 11/2004 | Gorte et al. | |
| 6,846,511 B2 | 1/2005 | Visco et al. | |
| 6,916,570 B2 | 7/2005 | Vaughey et al. | |
| 7,077,133 B2 | 7/2006 | Yagi et al. | |
| 7,125,528 B2 | 10/2006 | Besecker et al. | |
| 7,153,559 B2 | 12/2006 | Ito et al. | |
| 7,179,323 B2 | 2/2007 | Stein et al. | |
| 7,229,537 B2 | 6/2007 | Chen et al. | |
| 7,261,751 B2 | 8/2007 | Dutta et al. | |
| 7,320,778 B2 | 1/2008 | Whittenberger | |
| 7,351,488 B2 | 4/2008 | Visco et al. | |
| 7,374,601 B2 | 5/2008 | Bonchonsky et al. | |
| 7,396,442 B2 | 7/2008 | Bagby et al. | |
| 7,427,368 B2 | 9/2008 | Drnevich | |
| 7,470,811 B2 | 12/2008 | Thiebaut | |
| 7,510,594 B2 | 3/2009 | Wynn et al. | |
| 7,534,519 B2 | 5/2009 | Cable et al. | |
| 7,556,676 B2 | 7/2009 | Nagabhushana et al. | |
| 7,588,626 B2 | 9/2009 | Gopalan et al. | |
| 7,658,788 B2 | 2/2010 | Holmes et al. | |
| 7,786,180 B2 | 8/2010 | Fitzpatrick | |
| 7,833,314 B2 | 11/2010 | Lane et al. | |
| 7,846,236 B2 | 12/2010 | Del-Gallo et al. | |
| 7,856,829 B2 | 12/2010 | Shah et al. | |
| 7,871,579 B2 | 1/2011 | Tentarelli | |
| 7,901,837 B2 | 3/2011 | Jacobson et al. | |
| 7,906,079 B2 | 3/2011 | Whittenberger et al. | |
| 7,968,208 B2 | 6/2011 | Hodgson | |
| 8,070,922 B2 | 12/2011 | Nelson et al. | |
| 8,128,988 B2 | 3/2012 | Yasumoto et al. | |
| 8,196,387 B2 | 6/2012 | Shah et al. | |
| 8,201,852 B2 | 6/2012 | Linhorst et al. | |
| 8,262,755 B2 | 9/2012 | Repasky et al. | |
| 8,323,378 B2 | 12/2012 | Swami et al. | |

(56) References Cited

U.S. PATENT DOCUMENTS

| | | |
|---|---|---|
| 8,323,463 B2 | 12/2012 | Christie et al. |
| 8,349,214 B1 | 1/2013 | Kelly et al. |
| 8,419,827 B2 | 4/2013 | Kelly et al. |
| 8,435,332 B2 | 5/2013 | Christie et al. |
| 8,455,382 B2 | 6/2013 | Carolan et al. |
| 6,191,573 B1 | 11/2013 | Garing et al. |
| 8,658,328 B2 | 2/2014 | Suda et al. |
| 8,795,417 B2 | 8/2014 | Christie et al. |
| 8,894,944 B2 | 11/2014 | Larsen et al. |
| 2002/0073938 A1 | 6/2002 | Bool et al. |
| 2002/0078906 A1 | 6/2002 | Prasad et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0127656 A1 | 6/2006 | Gopalan et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0289215 A1 | 12/2007 | Hemmings et al. |
| 2007/0292342 A1 | 12/2007 | Hemmings et al. |
| 2007/0292742 A1 | 12/2007 | Hemmings et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2010/0015014 A1 | 1/2010 | Gopalan et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0193104 A1 | 8/2010 | Ryu et al. |
| 2010/0200418 A1 | 8/2010 | Licht |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0141672 A1 | 10/2011 | Repasky |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2013/0009100 A1 | 1/2013 | Kelly et al. |
| 2013/0009102 A1 | 1/2013 | Kelly |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |
| 2014/0319424 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |
| 2014/0323599 A1 | 10/2014 | Chakravarti et al. |
| 2015/0098872 A1 | 4/2015 | Kelly et al. |

FOREIGN PATENT DOCUMENTS

| | | |
|---|---|---|
| EP | 0 926 096 A1 | 6/1999 |
| EP | 0 984 500 A2 | 3/2000 |
| EP | 0 989 093 A2 | 3/2000 |
| EP | 1 504 811 A1 | 2/2005 |
| EP | 1717420 A1 | 11/2006 |
| EP | 1743694 A1 | 1/2007 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1348375 | 3/1974 |
| JP | 56-136605 | 10/1981 |
| WO | WO 9842636 | 10/1998 |
| WO | WO 0017418 | 3/2000 |
| WO | WO 0109059 A1 | 2/2001 |
| WO | WO 2007060141 | 5/2007 |
| WO | WO 2007086949 | 8/2007 |
| WO | WO 2008024405 | 2/2008 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013/062413 A1 | 5/2013 |
| WO | WO 2013089895 A1 | 6/2013 |
| WO | WO 2014074559 A1 | 5/2014 |
| WO | WO 2014077531 A1 | 5/2014 |
| WO | WO 2014/107707 A2 | 7/2014 |
| WO | WO 2014/176022 A1 | 10/2014 |

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

(56) References Cited

OTHER PUBLICATIONS

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2, Energy Convers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

Friedemann Marschner et al., "Gas Production", Ullmann's Encyclopedia of Industrial Chemistry, Jun. 15, 2000, pp. 1-21, XP002253967.

\* cited by examiner

OXYGEN TRANSPORT MEMBRANE BASED ADVANCED POWER CYCLE WITH LOW PRESSURE SYNTHESIS GAS SLIP STREAM

CROSS REFERENCE TO RELATED APPLICATIONS

This application claims priority to and the benefit of U.S. provisional patent application Ser. No. 61/746,820 filed on Dec. 28, 2012, the disclosure of which is incorporated by reference herein.

U.S. GOVERNMENT RIGHTS

This invention was made with Government support under Cooperative Agreement No. DE-FC26-07NT43088, awarded by the United States Department of Energy. The Government has certain rights in this invention.

FIELD OF THE INVENTION

The present invention relates to a method of generating electrical power in which a synthesis gas stream, produced in a gasifier, is combusted in an oxygen transport membrane based boiler to generate heat that is used to raise steam and that is in turn used in a steam turbine to generate electrical power. More particularly, the present invention relates to such a method in which a high pressure synthesis gas stream produced in the gasifier is indirectly heated in at least one oxygen transport membrane based partial oxidation reactor using a low pressure synthesis gas slip stream as fuel to combust with oxygen separated from a feed air stream by the oxygen transport membrane in the partial oxidation reactor and expanded in a turbine prior to being combusted in an oxygen transport membrane based boiler.

BACKGROUND

Coal-fired power plants are utilized throughout the world to generate electricity. Typically, the coal is either in a pulverized form or within a slurry is combusted to generate heat within a boiler to raise steam. The steam is passed into a steam turbine to generate electrical power. There has been recent interest in capturing carbon dioxide from power plants that use coal and other carbonaceous feed stock such as asphalt, heavy oil, petroleum coke, biomass or natural gas. An integrated gasification and combined cycle (IGCC) is proposed as a preferred method of power generation when carbon dioxide capture is required. In IGCC, gasification of fuel produces a synthesis gas containing mainly hydrogen, carbon monoxide and carbon dioxide with some amount of methane and sulfur and chloride containing impurities. In a typical gasifier the carbonaceous feed is reacted with steam and oxygen to produce the synthesis gas. Typically, the oxygen is provided to the gasifier by a cryogenic air separation unit.

In IGCC, the synthesis gas produced as a result of the gasification is typically cooled to a temperature suitable for its further processing in a water-gas shift reactor to increase the hydrogen and carbon dioxide content of the synthesis gas. The water-gas shift reactor also hydrolyzes most of the carbonyl sulfide into hydrogen sulfide. The synthesis gas is then further cooled for carbon dioxide and hydrogen sulfide separation within a solvent scrubbing plant employing physical or chemical absorption for separation of the carbon dioxide and hydrogen sulfides and carbonyl sulfide from the synthesis gas. This allows for the capture and sequestration of the carbon dioxide which is present within the synthesis gas. The resulting hydrogen-rich gas is then fed to a gas turbine that is coupled to an electrical generator to generate electricity. Heat is recovered from the cooling of the raw synthesis gas stream, from cooling the heated discharge from the water-gas shift reactor, and cooling the exhaust from the gas turbine to raise steam and to generate additional electrical power from a steam turbine.

As can be appreciated, the IGCC is environmentally very advantageous in that a clean burning synthesis gas stream is used to power the gas turbine while at the same time, the carbon dioxide produced by the gasification can be captured for use in other industrial processes, for enhanced oil recovery or for sequestration. The disadvantage of such an IGCC cycle is the high energy penalty associated with the air separation and solvent scrubbing plants. Additionally, the recovery of heat energy in several stages is inherently inefficient in that such heat recovery always involves loss and in any case, the heat is recovered at a low temperature. Lastly, the use of solvent scrubbing plants, water-gas shift reactors and gas turbines is an expensive proposition given their high capital costs.

The use of oxygen transport membrane (OTM) systems have also been contemplated in connection with boilers to generate products used to produce electricity, as disclosed in U.S. Pat. Nos. 6,394,043; 6,382,958; 6,562,104; and, more particularly U.S. Pat. Nos. 7,856,829 and 8,196,387. In such OTM based systems, oxygen is separated from the air with the use of a ceramic membrane that is capable of oxygen ion transport at elevated temperatures. The oxygen ionizes on one surface of the membrane by gaining electrons to form the oxygen ions. Under a driving force of a partial pressure differential, the oxygen ions pass through the membrane and either react with a fuel or recombine to elemental oxygen liberating the electrons used in the ionization of the oxygen.

An alternative oxygen transport membrane based system and the closest prior art for advanced power cycle systems are disclosed in U.S. Pat. Nos. 7,856,829 and 8,196,387. These prior art advanced power cycle systems require the oxygen transport membrane to operate in a high pressure environment of about 350 psig, particularly in the POx stages which directly heat the synthesis gas from the gasifier ahead of any expansion stages. One of the recognized problems associated with oxygen transport membranes is that when operating in severe environments, such as high pressure environments, the reliability of the oxygen transport membranes typically suffer resulting in more membrane failures and associated system operating downtime and maintenance costs. In addition, oxygen transport membranes that are designed to operate in higher pressure environments typically require very thick support layers thus significantly increasing the cost of the oxygen transport membranes and associated reactors.

In lieu of operating the oxygen transport membranes at such high pressures, prior art solutions contemplate regulating a portion of the high pressure gasifier stream to lower pressure levels before introduction to the oxygen transport membranes based reactors. Regulating or reducing the high pressure gasifier stream involves specialized equipment and adversely impacts the overall economics and efficiency of the oxygen transport membrane based power system. Also, the prior art solutions requires the oxygen transport membranes to operate at very low fuel utilization or conversions rates making it difficult to control the oxygen flux across the membranes, since oxygen flux is a decreasing function of the fuel utilization or fuel conversion.

What is needed therefore is a method for generating power from a high pressure gasifier stream using an oxygen transport membrane based system designed to operate at lower pressures and is more cost efficient than the current prior art oxygen transport membrane based power cycle systems and solutions. In particular, what is needed is an oxygen transport membrane based power cycle system that facilitates operation of the oxygen transport membrane at low fuel pressures with high fuel utilization or fuel conversion.

SUMMARY OF THE INVENTION

The present invention may be characterized as a method of generating electrical power comprising the steps of: (i) generating a synthesis gas stream in a gasifier; (ii) heating the synthesis gas stream via indirect heat exchange with radiant heat generated from at least one oxygen transport membrane based partial oxidation reactor; (iii) expanding the heated synthesis gas stream in at least one expansion stage; (iv) diverting a portion of the expanded synthesis gas stream to the at least one oxygen transport membrane based partial oxidation reactor where such diverted portion of the synthesis gas stream is partially oxidized with permeated oxygen from the oxygen transport membrane based partial oxidation reactor to produce a reaction product stream and the radiant heat; (v) feeding another portion of the expanded synthesis gas stream and the reaction product stream to an oxygen transport membrane based boiler where the synthesis gas stream and reaction product stream react with permeated oxygen and a source of supplemental oxygen to produce steam from a source of boiler feed water and produce a carbon dioxide containing flue gas stream; (vi) extracting energy from the steam by a steam turbine subsystem operatively associated with the oxygen transport membrane based boiler and converting the extracted energy to electrical power; and (vii) purifying the carbon dioxide containing flue gas stream to produce a carbon dioxide-rich stream.

The present invention may also be characterized as an oxygen transport membrane based advanced power cycle system comprising: (a) a source of high pressure synthesis gas; (b) at least one oxygen transport membrane based partial oxidation reactor having one or more oxygen transport membrane elements and one or more metal tubes containing the synthesis gas and disposed adjacent or juxtaposed to the one or more oxygen transport membrane elements; (c) at least one expander disposed downstream of the at least one oxygen transport membrane based partial oxidation reactor, the expander configured to expand the heated synthesis gas stream to produce energy and reduce the pressure of the synthesis gas stream; (d) a recycle conduit configured to divert a portion of the expanded synthesis gas stream to the at least one oxygen transport membrane based partial oxidation reactor where such diverted portion of the synthesis gas stream is the low pressure synthesis gas slip stream that is partially oxidized with the permeated oxygen; (e) an oxygen transport membrane based boiler having one or more oxygen transport membrane elements and one or more steam tubes containing the boiler feed water and disposed adjacent or juxtaposed to the one or more oxygen transport membrane elements in the oxygen transport membrane based boiler, and (f) a steam turbine subsystem operatively associated with the oxygen transport membrane based boiler and configured to convert the steam to electrical power. Optionally, the at least one oxygen transport membrane based partial oxidation reactor and the at least one an oxygen transport membrane based boiler may be disposed in an integrated reactor housing to reduce capital costs associated with the system.

The at least one oxygen transport membrane based partial oxidation reactor is configured to partially oxidize a low pressure synthesis gas slip stream with oxygen permeated through one or more oxygen transport membrane elements to produce a reaction product stream and the first source of radiant heat; and wherein the radiant heat is used to heat the synthesis gas stream in adjacent metal tubes. The oxygen transport membrane based boiler configured to heat the boiler feed water in the steam tubes to produce steam via indirect heat exchange with a second source of radiant heat generated from a combustion of the low pressure synthesis gas with oxygen permeated through the one or more oxygen transport membrane elements in the oxygen transport membrane based boiler. The oxygen transport membrane based boiler is further configured to combust any expanded synthesis gas stream with a source of supplemental oxygen, such as cryogenically produced oxygen from an air separation unit, to produce a carbon dioxide containing flue gas and to further heat the boiler feed water in the steam tubes to produce steam.

Some embodiments of the oxygen transport membrane based advanced power cycle system and associated methods of generating electrical power may also include a carbon dioxide purification subsystem configured to purify the carbon dioxide containing flue gas stream and produce a carbon dioxide-rich stream. Other embodiments of the oxygen transport membrane based advanced power cycle system may also include an air supply and preheat subsystem that includes an oxygen containing feed stream; a regenerative air preheater configured to heat the oxygen containing feed stream; a plurality of conduits for supplying the heated oxygen containing feed stream from the regenerative air preheater to the oxygen transport membrane based partial oxidation reactors and the oxygen transport membrane based boiler; and a plurality of return conduits configured to return a heated, oxygen depleted stream from the oxygen transport membrane based partial oxidation reactors and the oxygen transport membrane based boiler to the regenerative air preheater to heat oxygen containing feed stream.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

DETAILED DESCRIPTION

Figure 1:
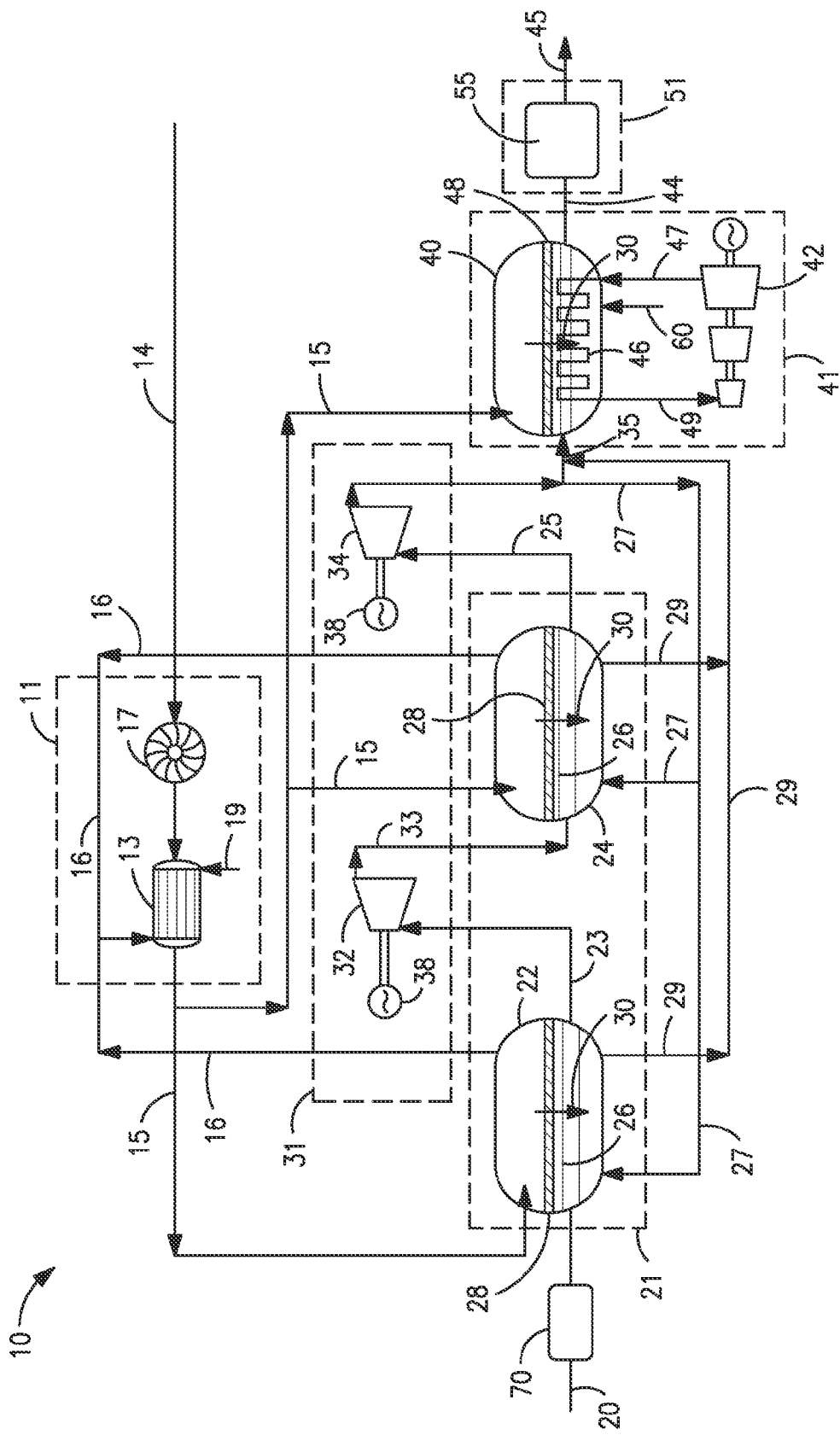
FIG. 1 is a schematic illustration of the present oxygen transport membrane based advanced power cycle system and associated method for generating electrical power from a high pressure gasifier stream employing a low pressure synthesis gas slip stream in accordance with the present invention.

In a broad sense, the illustrated advanced power cycle system 10 comprises an air supply and preheating subsystem 11; one or more oxygen transport membrane based partial oxidation stages 21; one or more expansion stages 31; an oxygen transport membrane based boiler and power generation subsystem 41; and a carbon dioxide purification unit or subsystem 51.

With reference to FIG. 1, the air supply and preheating subsystem 11 includes a source of feed air or other oxygen containing feed stream 14; a regenerative air preheater 13 configured to heat the source of feed air 14; and conduits for supplying the heated feed air stream 15 from the regenerative air preheater 13 to the OTM POx reactors 22, 24 and OTM boiler 40. The air supply and preheat subsystem 11 further includes a plurality of return conduits configured to return the heated, oxygen depleted air stream 16 from the OTM POx reactors 22, 24 and OTM boiler 40 to the regenerative air preheater 13 to heat the source of feed air or other oxygen containing feed stream 14 and subsequently exhaust the oxygen depleted stream 19.

As the heated feed air stream 15 flows along the oxidant-side surface of the heated OTM elements or tubes 28, 48 in the OTM POx reactors 22, 24 and OTM boiler 40, the feed air stream 15 becomes generally depleted of oxygen and heated as a result of convective heat transfer from the OTM elements or tubes 28, 48 and the passing air stream. Modeling of the presently disclosed advanced power cycle system 10 shows that approximately 70% or more of the oxygen within the feed air stream 15 is transported or permeated across the OTM elements or tubes 28, 48. The residual streams are heated, oxygen-depleted streams 16 that exit the OTM boiler 40 or OTM POx reactors 22, 24 where they are combined and preferably used to preheat the incoming feed air stream 14, via a ceramic regenerative air preheater 13.

It should be appreciated that in the present illustrated embodiment, no standard flue gas-to-air preheater exists because air preheating for the feed air stream 14 is handled separately in a regenerative heat exchanger 13, preferably a ceramic regenerator, although the ceramic regenerative heat exchanger 13 could be any type of thermal regenerator that uses a high temperature capable medium to store and transfer heat. Separate air preheaters for each of the OTM POx reactors 22, 24 and for the OTM boiler 40 are not required, although use of multiple regenerators or a modularized regenerator may be used in lieu of the illustrated single regenerator. The illustrated air supply and preheat subsystem 11 also includes a blower or fan 17 needed to convey an oxygen containing feed streams 14 through the single regenerative air preheater 13, downstream and OTM POx reactors 22, 24 and OTM boiler 40.

Figure 2:
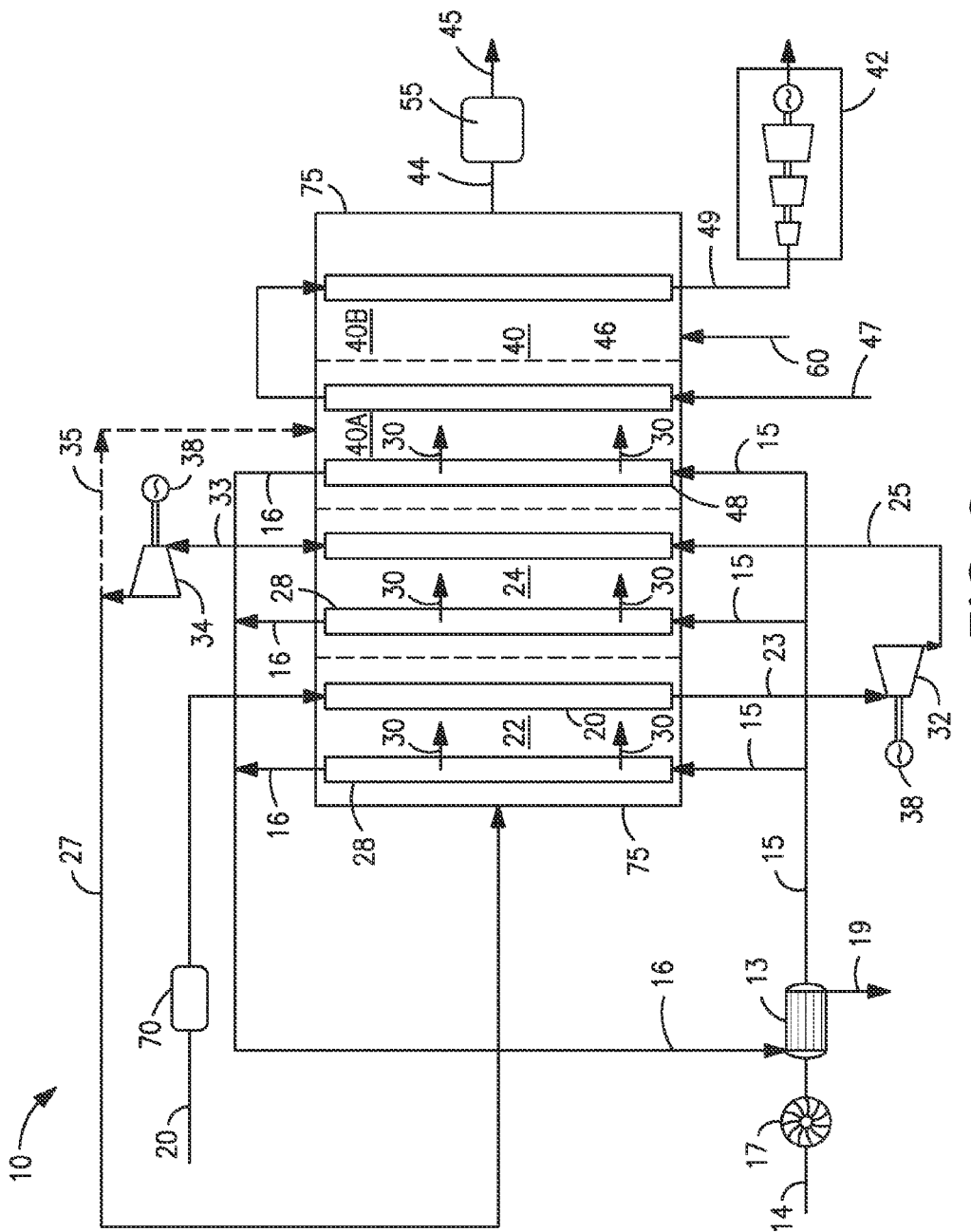
FIG. 2 is a schematic illustration of an alternate embodiment of the oxygen transport membrane based advanced power cycle with an integrated reactor employing the low pressure synthesis gas slip stream in accordance with the present invention.

The illustrated advanced power cycle system 10 of FIG. 1 and FIG. 2 may also include a gasifier (not shown) for generating a high pressure synthesis gas stream 20, two oxygen transport membrane partial oxidation (OTM POx) reactors 22, 24; a pair of turbo-expanders 32, 34 each disposed downstream of the OTM POx reactors 22, 24; and a OTM boiler 40. The pair of OTM partial oxidation (POx) reactors 22, 24 are configured to partially oxidizing a low pressure synthesis gas stream slipstream 27 using permeated oxygen (shown as arrow 30) from the oxygen transport membranes and produce radiant heat used to indirectly heat the high pressure synthesis gas stream 20. The turbo-expanders 32, 34 are configured to expand the heated synthesis gas stream to generate electrical power and condition the synthesis gas stream 20. A first portion of the expanded synthesis gas stream forms the low pressure synthesis gas slip stream 27 and a second portion of the low pressure expanded synthesis gas stream 35 is fed to the OTM boiler 40. The OTM boiler 40 receives a portion of the expanded synthesis gas stream 35 which reacts with permeated oxygen 30 from the oxygen transport membrane elements 48 associated with the OTM boiler 40 and produce heat used to raise steam 49 from boiler feed water 47. The OTM boiler is also operatively coupled to a steam turbine system 42 which uses the produced steam 49 to generate electrical power.

Specifically, the one or more oxygen transport membrane based partial oxidation stages is comprised of a pair of OTM POx reactors 22, 24 that operate at lower fuel pressures and higher fuel utilization rates than prior art advanced power cycle systems. The low fuel pressure and high fuel utilization is achieved by recycling a portion of the expanded synthesis gas streams, referred to as the synthesis gas slip stream 27, and combusting the low pressure synthesis gas slip stream 27 with the permeated oxygen 30 in the OTM POx reactors 22, 24. In the illustrated embodiment, the first OTM POx reactor 22 is used to combust enough of the synthesis gas slip stream 27 to raise the temperature of the high pressure synthesis gas stream 23 to about 900° C. or higher. The heated synthesis gas stream 23 is then expanded using a turbo-expander 32 to an intermediate pressure and is directed or fed through a second OTM POx reactor 24. The second OTM POx reactor 24 again oxidizes only enough of the low pressure synthesis gas slip stream 27 with permeated oxygen 30 to further heat the intermediate pressure synthesis gas stream 25 to a temperature of about 930° C. or higher. The intermediate pressure heated synthesis gas stream 25 is then directed or fed through a second turbo-expander 34 and is expanded to near atmospheric pressure. Using the two expansion stages, rather than a single expansion stage, improves the efficiency of the advanced power cycle system 10. In some embodiments, the pair of turbo-expanders 32, 34 may be operatively coupled to one or more generators configured to recover supplemental electrical power from the one or more expansion stages.

In the proposed arrangement of the advanced power cycle system 10, the expansion power of each turbine unit or turbo-expander 32, 34 is similar to that of a General Electric Frame 5 Gas Turbine. Expander performance end efficiency was estimated to be about 85% for the first expansion stage and about 92% for the second expansion stage. As discussed above, a portion of the further expanded synthesis gas 25 is split off downstream of the second turbo-expander 34 and sent back or recycled to the OTM POx reactors 22, 24 to be used as the low pressure synthesis gas slip stream 27.

The OTM POx reactors 22, 24 preferably comprise a plurality of OTM elements or tubes 28 configured to separate and transport oxygen ions from the heated oxygen containing feed stream 15 contacting the oxidant side to the permeate or reactive side of the OTM elements or tubes 28 where the oxygen ions are recombined to form oxygen. The permeated oxygen 30 reacts with a portion of the low pressure synthesis gas slip-stream 27 to produce supplemental reaction products 29 and, more importantly, heat. The heat generated from the partial oxidation of the permeated oxygen 30 and low pressure synthesis gas slip stream 27 is radiated to metallic tubes 26 that contain the high pressure synthesis gas stream disposed near or juxtaposed to the OTM elements or tubes 28. Any unused portion of synthesis gas slip stream 27 together with the reaction products 29 from the partial oxidation occurring within the OTM POx reactors 22, 24 are then mixed back in with the further expanded synthesis gas stream 35 that is fed to the OTM boiler 40.

Advantageously, the recycling of low pressure synthesis gas slip-stream 27 to the permeate or reactive side of the OTM elements or tubes 28 combined with the low pressure air feed stream 15 on the oxidant side OTM elements or tubes 28, 48 allows for the OTM based POx reactors 22, 24 and OTM boiler 40 to operate at low pressure on both sides of the oxygen transport membranes which decreases system costs and minimizes risks associated with operating the OTM ceramic materials under high pressure gradients. Since the recycled synthesis gas slip stream 27 is a low pressure stream, the operational environment of the OTM POx reactors 22, 24 is less severe than prior art systems and the OTM elements or tubes 28 are generally less costly to manufacture. The relative flows of the synthesis gas slip stream 27 directed to each of the POx reactors 22, 24 are preferably controlled to optimize fuel utilization of the advanced power cycle system 10.

Following the second turbo-expander 34, the still mostly un-oxidized and low pressure synthesis gas stream 35 flows to the OTM boiler 40 where a plurality of OTM elements or tubes 48 are disposed that provide or supply the oxygen required to support the combustion of up to about 95% of the low pressure synthesis gas stream 35. In the OTM boiler 40, steam tubes 46 are also arranged proximate or juxtaposed to the OTM elements or tubes 48 for removal of energy needed to keep the gas and surface temperatures of the OTM elements or tubes 48 at around 1000° C. The majority of the synthesis gas stream 35 flowing through the OTM boiler 40 is combusted at or near atmospheric pressure using the permeated oxygen 30 and the resulting heat is used to raise steam to facilitate the removal of energy from the system.

A non-traditional boiler arrangement is preferably used in order to accommodate both the OTM surface temperatures and the steam tube surface temperatures. The section of the boiler containing OTM elements or tubes 48 should preferably be maintained at between 900° C. and 1100° C., and more preferably at about 1000° C. for optimal membrane performance. In addition to the OTM element temperatures, the degree of synthesis gas combustion via the OTM elements or tubes 28, 48 is also an important optimization variable. Thus, use of oxidation catalysts within the OTM elements or tubes may be considered. Depending on OTM oxygen flux and across the OTM elements or tubes 28, 48 and the amount of recycled low pressure synthesis gas slip stream 27 fed to the reactant side of the OTM POx reactors 22, 24, it is estimated that between about 70% and 95% of the total synthesis gas stream may be reacted or combusted with permeated oxygen 30 from OTM elements or tubes 28, 48 the majority of which occurs in OTM boiler 40.

While combustion of the low pressure synthesis gas stream 35 with permeated oxygen 30 Following the last section of OTM elements or tubes 48 in the OTM boiler 40, some synthesis gas still remains unreacted in the gas stream, typically between about 5% and 30% of the original synthesis gas stream 20. A source of oxygen 60 from a cryogenic air separation plant (not shown) is then used to combust the remaining synthesis gas within the low pressure gas stream 35, further increasing the temperature of the carbon dioxide containing flue gas 44 to roughly 1400° C. The carbon dioxide containing flue gas 44 is then cooled in a heat recovery train (not shown) preferably first by radiative heat transfer and then via convective heat transfer against high pressure water in a standard economizer. Enough supplemental oxygen 60 from the cryogenic air separation unit is used in the downstream section or combustion section of the OTM boiler 40 to preferably yield about 1.2 mol % excess oxygen in the carbon dioxide containing flue gas 44. Once the carbon dioxide containing flue gas 44 has cooled to sub-economizer temperatures the cooled carbon dioxide containing flue gas 44 continues to cool against low pressure boiler feed water. Due to the high moisture level in the cooled flue gas 44 some latent heat is transferable to the boiler feed water stream. In addition, some amount of energy is also available from the gasifier subsystem which optionally may be used to preheat the boiler feed water.

A cryogenic air separation unit (not shown) is used to supply gaseous oxygen to the gasifier (not shown) and the supplemental combustor operatively associated with the OTM boiler 40. This cryogenically supplied oxygen 60 accounts for roughly 33% of the total oxygen consumed by the presently disclosed process, with the other 67% supplied using the OTM elements or tubes 28, 48 in the OTM POx reactors 22, 24 and OTM boiler 40. The oxygen purity delivered by the air separation unit is preferably only about 95.5 mol % oxygen. The cryogenic air separation unit design is preferably a commercially available low purity, low pressure air separation unit, known to those persons skilled in the art cryogenic air separation plants.

The carbon dioxide containing flue gas 44 from the OTM boiler 40 is then directed to a Carbon Dioxide Processing Unit 55 or CPU. The CPU compresses and purifies the flue gas to a carbon dioxide stream 45 suitable for sequestration. Following the latent heat removal operation, the CPU compresses the carbon dioxide containing flue gas to roughly 375 psi in a five stage compression train with an average stage polytropic efficiency of about 85% and a mechanical efficiency of about 98.5%. Preferably, the compressed flue gas stream is also treated for removal of mercury, water and selected acids and preferably subjected to an auto-refrigerative process for inert removal. The auto-refrigerative process purifies the carbon dioxide stream to about 95% or greater purity with 97% recovery of carbon dioxide. This cryogenic process also produces a vent stream which is enriched in atmospheric gases (e.g., $N_2$, $O_2$, Ar). Following the cryogenic portion of the CPU, the purified carbon dioxide stream is further compressed to 2000 psi.

Although not shown in detail, the present advanced power cycle system 10 may also include a synthesis gas pretreatment subsystem 70 for $H_2S$ and COS control following the gasifier and before the high pressure synthesis gas flows to the first OTM POx reactor. The preferred synthesis gas pretreatment process is a warm gas cleanup process using a solid regenerable sorbent. In the preferred warm gas cleanup process, the high temperature and high pressure synthesis gas product exiting the gasifier is brought into contact with a solid metal oxide sorbent, typically ZnO such that the $H_2S$ and COS in the synthesis gas form a metal sulfide, typically ZnS. A portion of the solid sorbent is continually withdrawn from the absorber unit, regenerated and re-introduced back to the absorber unit. During the regenerating process, the spent solid sorbent is regenerated with air at near atmospheric pressure, producing ZnO and a SOx containing gas stream. The regenerated ZnO sorbent is then returned to the absorber while the SOx containing gas stream is processed for SOx control, using techniques generally known to those skilled in the art.

The key advantages and operating characteristics of the present advanced power cycle system include: (i) ability to maintain and control the membrane flux at high fuel utilizations; (ii) the OTM elements or tubes are at low pressures and the high pressure synthesis gas is contained and heated in much stronger metal tubes or heat exchangers; (iii) the flow of the synthesis gas to the multiple OTM POx stages or reactors provides an independent control variable for temperature management; (iv) design allows for standardized OTM modules which could be used in both the OTM boiler and the OTM POx reactors; (v) the use of recycled low pressure synthesis gas slip stream eliminates the need to regulate the high pressure synthesis gas exiting the gasifier or the synthesis gas pretreatment process. More importantly, the present advanced power cycle system offers process efficiency and potential cost advantages over the prior art OTM based systems used in power generation applications.

For example, because the presently disclosed advanced power cycle system and method employ a plurality of similar OTM elements or tubes placed directly within the OTM boiler as well as the OTM POx reactors where the permeated oxygen is consumed on the reactive-side of the OTM elements or tubes to produce heat, it is possible to use standardized designs the OTM elements or tubes that are similar in structure and performance. Also, because the partial oxidation and combustion reactions occurs at or on the surface of the OTM elements or tubes an extremely low oxygen partial pressure is achieved on the reactive side of the membrane elements and a driving force for oxygen ion transport from the oxidant-side to the reactant-side of the OTM elements or tubes is established since the feed air streams have a much higher oxygen partial pressure. This, in turn, allows the present advanced power cycle system to use low pressure rated OTM materials and designs while also permitting control the OTM oxygen flux with high fuel utilizations.

In addition to the aforementioned advantages and operating characteristics, the low pressure operation of the OTM elements or tubes allows for the integration of the OTM POx reactors 22, 24 and OTM boiler 40 into a single reactor housing 75 as depicted in FIG. 2. In this illustrated schematic, ceramic oxygen transport membrane tubes 28 are placed in close proximity to metal tubes 26 used for synthesis gas heating in the OTM POx reactors 22, 24 while ceramic oxygen transport membrane tubes 48 are placed adjacent to and in close proximity to metal steam tubes in the OTM boiler 40. In the illustrated embodiment, the heated feed air stream 15 is preferably on the inside or oxidant side of the OTM tubes while the low pressure synthesis gas stream flows in contact with the outside or reactant side of the OTM tubes. Alternative arrangements may be designed that reverse the reactant and oxidant sides such that the heated feed air stream is preferably on the outside of the OTM tubes while the low pressure synthesis gas stream flows in contact with the interior surfaces of the OTM tubes. Still further, embodiments are contemplated where the OTM POx reactors have the oxidant side on the outside of the OTM tubes and reactant side on the inside of the OTM tubes while the OTM boiler has the reverse configuration.

In the embodiment of FIG. 2, the synthesis gas 20 from the gasifier (not shown) is indirectly heated as it passes through the metal tubes 26 by mostly radiation from the partial oxidation occurring at the reactant-side surface of the adjacent or juxtaposed OTM tubes 28 of a first OTM POx reactor 22. The heated synthesis gas 23 is expanded in a first turbo-expander 32 and sent back through additional metal tubes 26 disposed within the integrated reactor housing 75 to be heated again using OTM tubes 28 associated with a second OTM POx reactor 24. This re-heated synthesis gas stream 25 is then sent to a second turbo-expander 34. Some or all of the further expanded synthesis gas exiting the second turbo-expander 34 becomes the low pressure fuel or synthesis gas slip stream 27 for the OTM POx reactors 22, 24 and the OTM boiler 40 disposed within the integrated reactor housing 75. Alternatively, a portion of the further expanded synthesis gas stream 35 may be directed or fed to the OTM boiler while a portion is diverted as the synthesis gas slip stream 27 to the OTM POx reactors 22, 24 and OTM boiler 40.

In the illustrated embodiment, the OTM boiler 40 is bifurcated or split into two distinct sections 40A, 40B. The first section or upstream section 40A is an OTM based section that reacts a portion of the low pressure expanded synthesis gas slip stream 27 with permeated oxygen 30 produced by the OTM elements or tubes 48 in the OTM boiler 40. The second downstream section 40B or combustion section of the OTM boiler 40 is configured to complete the combustion of any remaining low pressure synthesis gas in the slip stream 27 as well as the low pressure synthesis gas slip stream 35 through the addition of a small amount of cryogenically produced oxygen 60 into the reactor housing 75. The proposed integration of two OTM POx reactors 22, 24 and OTM boiler 40 into one integrated reactor housing 75 greatly reduces the capital cost of the overall advanced power cycle system 10. This is of course made possible by utilizing the low pressure synthesis gas slipstream 27 described above.

While the present invention has been characterized in various ways and described in relation to preferred embodiments, as will occur to those skilled in the art, numerous, additions, changes and modifications thereto can be made to the present method and system without departing from the spirit and scope of the present invention as set forth in the appended claims.

What is claimed is:

1. A method of generating electrical power comprising the steps of:
    generating a synthesis gas stream in a gasifier;
    heating the synthesis gas stream via indirect heat exchange with radiant heat generated from at least one oxygen transport membrane based partial oxidation reactor;
    expanding the heated synthesis gas stream in at least one expansion stage;
    diverting a portion of the expanded synthesis gas stream to the at least one oxygen transport membrane based partial oxidation reactor where such diverted portion of the synthesis gas stream is partially oxidized with permeated oxygen from the oxygen transport membrane based partial oxidation reactor to produce a reaction product stream and the radiant heat;
    feeding another portion of the expanded synthesis gas stream and the reaction product stream to an oxygen transport membrane based boiler where the synthesis gas stream and reaction product stream react with permeated oxygen and a source of supplemental oxygen to produce steam from a source of boiler feed water and to produce a carbon dioxide containing flue gas stream;
    extracting energy from the steam by a steam turbine subsystem operatively associated with the oxygen transport membrane based boiler and converting the extracted energy to electrical power; and
    purifying the carbon dioxide containing flue gas stream to produce a carbon dioxide-rich stream.

2. The method of claim 1 further comprising coupling a generator to the at least one expansion stage and generating electrical power from the generator.

3. The method of claim 2 wherein the at least one expansion stage further comprises a first expansion stage having a first expander and a second expansion stage having a second expander wherein electrical power is generated from one or more generators coupled to the first and second expanders.

4. The method of claim 1 wherein the steps of heating the synthesis gas stream and expanding the heated synthesis gas stream further comprise:

heating the synthesis gas stream via indirect heat exchange with radiant heat generated from a first oxygen transport membrane based partial oxidation reactor;

expanding the heated synthesis gas stream in a first expander;

further heating the expanded synthesis gas stream via indirect heat exchange with radiant heat generated from a second oxygen transport membrane based partial oxidation reactor; and further expanding the further heated synthesis gas stream in a second expander.

5. The method of claim 4 wherein the steps of diverting a portion of the expanded synthesis gas stream and feeding streams to the boiler further comprise:

diverting a portion of the expanded synthesis gas stream or further expanded synthesis gas stream to the oxygen transport membrane based partial oxidation reactors where such diverted portions of the synthesis gas stream are partially oxidized with permeated oxygen from the oxygen transport membrane based partial oxidation reactors to produce reaction product streams and the radiant heat; and feeding the further expanded synthesis gas stream and the reaction product streams to the boiler to produce the steam.

6. The method of claim 1 wherein the source of supplemental oxygen is cryogenically produced oxygen from an air separation unit.

7. The method of claim 1 wherein the boiler is an oxygen transport membrane based boiler that reacts a portion of the synthesis gas stream with oxygen permeated through at least one oxygen transport membrane element to produce the difference in oxygen partial pressure across the at least one oxygen transport membrane element and generate the source of heat within the boiler required to produce the steam and the carbon dioxide containing flue gas stream.

8. An oxygen transport membrane based advanced power cycle system comprising:

a source of high pressure synthesis gas;

at least one oxygen transport membrane based partial oxidation reactor having one or more oxygen transport membrane elements and one or more metal tubes containing the synthesis gas and disposed adjacent or juxtaposed to the one or more oxygen transport membrane elements, the at least one oxygen transport membrane based partial oxidation reactor configured to heat the synthesis gas stream in the metal tubes via indirect heat exchange with a first source of radiant heat generated from a partial oxidation of a low pressure synthesis gas slip stream with oxygen permeated through the one or more oxygen transport membrane elements, and wherein the partial oxidation further produces a reaction product stream and the first source of radiant heat;

at least one expander disposed downstream of the at least one oxygen transport membrane based partial oxidation reactor, the expander configured to expand the heated synthesis gas stream to produce energy and reduce the pressure of the synthesis gas stream;

a recycle conduit configured to divert a portion of the expanded synthesis gas stream to the at least one oxygen transport membrane based partial oxidation reactor where such diverted portion of the synthesis gas stream is the low pressure synthesis gas slip stream that is partially oxidized with the permeated oxygen;

an oxygen transport membrane based boiler having one or more oxygen transport membrane elements and one or more steam tubes containing the boiler feed water and disposed adjacent or juxtaposed to the one or more oxygen transport membrane elements in the oxygen transport membrane based boiler, the oxygen transport membrane based boiler configured to heat the boiler feed water in the steam tubes to produce steam via indirect heat exchange with a second source of radiant heat generated from a combustion of the low pressure synthesis gas with oxygen permeated through the one or more oxygen transport membrane elements, and wherein the combustion produces the second source of radiant heat;

wherein the oxygen transport membrane based boiler is further configured to combust any expanded synthesis gas stream with a source of supplemental oxygen to produce a carbon dioxide containing flue gas and to further heat the boiler feed water in the steam tubes to produce steam; and a steam turbine subsystem operatively associated with the oxygen transport membrane based boiler and configured to convert the steam to electrical power.

9. The system of claim 8 further comprising a carbon dioxide purification subsystem configured to purify the carbon dioxide containing flue gas stream and produce a carbon dioxide-rich stream.

10. The system of claim 8 further comprising:

an air supply and preheat subsystem that includes an oxygen containing feed stream;

a regenerative air preheater configured to heat the oxygen containing feed stream;

a plurality of conduits for supplying the heated oxygen containing feed stream from the regenerative air preheater to the oxygen transport membrane based partial oxidation reactors and the oxygen transport membrane based boiler; and a plurality of return conduits configured to return a heated, oxygen depleted stream from the oxygen transport membrane based partial oxidation reactors and the oxygen transport membrane based boiler to the regenerative air preheater to heat oxygen containing feed stream.

11. The system of claim 10 further comprising a reactor housing configured to contain the at least one oxygen transport membrane based partial oxidation reactor and the oxygen transport membrane based boiler.

12. The system of claim 11 wherein the oxygen transport membrane elements are oxygen transport membrane tubes and the oxygen containing feed stream is supplied to the interior of the oxygen transport membrane tubes while the low pressure synthesis gas slip stream is supplied to the at least one oxygen transport membrane based partial oxidation reactor and the oxygen transport membrane based boiler via a common duct or passage through the reactor housing and the oxygen containing feed stream is supplied to the interior of the oxygen transport membrane tubes.

13. The system of claim 8 further comprising a generator operatively coupled to the at least one expander and configured to generate electrical power from the expansion of the heated synthesis gas.

14. The system of claim 8 wherein the supplemental oxygen is oxygen produced from an air separation unit.

15. The system of claim 8 wherein the at least one oxygen transport membrane based partial oxidation reactor and the at least one expander and further comprise:
- a first oxygen transport membrane based partial oxidation reactor configured to heat the synthesis gas stream in adjacent metal tubes via indirect heat exchange with radiant heat generated from a partial oxidation of a low pressure synthesis gas slip stream with oxygen permeated through the one or more oxygen transport membrane elements in the first oxygen transport membrane based partial oxidation reactor;
- a first turbo-expander disposed downstream of the first oxygen transport membrane based partial oxidation reactor, the first turbo-expander configured to expand the heated synthesis gas stream to an intermediate pressure;
- a second oxygen transport membrane based partial oxidation reactor configured to further heat the heated synthesis gas stream in adjacent metal tubes via indirect heat exchange with radiant heat generated from a partial oxidation of a low pressure synthesis gas slip stream with oxygen permeated through the one or more oxygen transport membrane elements in the second oxygen transport membrane based partial oxidation reactor; and
- a second turbo-expander disposed downstream of the second oxygen transport membrane based partial oxidation reactor, the second turbo-expander configured to expand the heated synthesis gas stream to near atmospheric pressure.

\* \* \* \* \*